(12) United States Patent
Hayashi

(10) Patent No.: US 9,311,958 B2
(45) Date of Patent: Apr. 12, 2016

(54) RECORDING/REPRODUCING SYSTEM AND SERVER

(71) Applicants: Hitachi-LG Data Storage, Inc., Tokyo (JP); Hitachi Consumer Electronics Co., Ltd., Tokyo (JP)

(72) Inventor: Hisahiro Hayashi, Fujisawa (JP)

(73) Assignees: HITACHI-LG DATA STORAGE, INC., Tokyo (JP); HITACHI CONSUMER ELECTRONICS CO., LTD., Tokyo (JP)

( * ) Notice: Subject to any disclaimer, the term of this patent is extended or adjusted under 35 U.S.C. 154(b) by 0 days.

(21) Appl. No.: 13/758,064

(22) Filed: Feb. 4, 2013

(65) Prior Publication Data

US 2013/0201809 A1   Aug. 8, 2013

(30) Foreign Application Priority Data

Feb. 6, 2012   (JP) ................. 2012-022649

(51) Int. Cl.

| G11B 5/09 | (2006.01) |
|---|---|
| G11B 27/36 | (2006.01) |
| G06F 13/00 | (2006.01) |
| G06F 11/16 | (2006.01) |
| G11B 20/18 | (2006.01) |
| G06F 11/14 | (2006.01) |

(52) U.S. Cl.
CPC ........ G11B 20/1816 (2013.01); G06F 11/1461 (2013.01); G11B 20/1833 (2013.01); G11B 20/1883 (2013.01); G11B 27/36 (2013.01); G11B 2020/1869 (2013.01); G11B 2220/20 (2013.01); G11B 2220/2537 (2013.01); G11B 2220/41 (2013.01); G11B 2220/415 (2013.01); G11B 2220/45 (2013.01)

(58) Field of Classification Search
CPC ............ G06F 11/1456; G06F 11/1469; G06F 11/1662; G06F 11/2071; G06F 11/2094; G11B 20/1883; G11B 2220/20; G11B 2220/2516; G11B 2220/415; G11B 20/1833; G11B 27/36
USPC ......... 369/84, 85, 30.05, 30.19, 53.12–53.17, 369/44.32, 44.33, 47.1–47.14, 30.38–30.4, 369/30.48, 30.6, 32.01, 33.01, 34.01; 360/74.1
See application file for complete search history.

(56) References Cited

U.S. PATENT DOCUMENTS

| 5,870,360 A | 2/1999 | Ito et al. |
|---|---|---|
| 6,125,427 A * | 9/2000 | Oeda et al. ................. 711/111 |
| 6,600,967 B2 * | 7/2003 | Milligan et al. ............. 700/214 |
| 6,937,540 B1 * | 8/2005 | Kikuchi et al. ............ 369/30.03 |

(Continued)

FOREIGN PATENT DOCUMENTS

| JP | 06-332768 A | 12/1994 |
|---|---|---|
| JP | 08-263335 A | 10/1996 |
| JP | 2005-25861 | 1/2005 |

OTHER PUBLICATIONS

U.S. Appl. No. 13/782,059, filed Mar. 1, 2013.
U.S. Appl. No. 13/782,059 Office Action mailed Feb. 12, 2015.

Primary Examiner — Dionne H Pendleton
(74) Attorney, Agent, or Firm — Baker Botts L.L.P.

(57) ABSTRACT

If a fault, or deterioration in read-out quality, is detected during recording processing with respect to a first recording face, a duplication is made, with respect to the recorded data on the second recording face of the same recording medium, on a separate recording medium.

11 Claims, 13 Drawing Sheets

(56) References Cited

U.S. PATENT DOCUMENTS

| | | | |
|---|---|---|---|
| 7,472,223 B1 * | 12/2008 | Ofer | G06F 11/1662 711/112 |
| 8,032,702 B2 * | 10/2011 | Grimes | G06F 11/1469 711/114 |
| 8,289,641 B1 * | 10/2012 | Emami | G11B 20/1833 360/31 |
| 2005/0094181 A1 | 5/2005 | Koyano | |
| 2010/0111489 A1 * | 5/2010 | Presler | H04N 5/225 386/278 |

* cited by examiner

FIG. 13

| ADMINISTRATION NO. | OPTICAL DISC ADMINISTRATION INFORMATION ||||||
|---|---|---|---|---|---|---|
| | SERIAL NO. | DISC CLASS | ADMINISTRATION START DATE | DATE OF FINAL UPDATE | NUMBER OF ACCESSES | DEGREE OF DETERIORATION |
| 1 | 00001691h | BD-R | 2011/1/1 | 2011/5/5 | 100 | 1 |
| 2 | 00001961h | BD-R | 2011/1/1 | - | 1 | 0 |
| 3 | 00001964h | BD-R | 2011/1/1 | - | 1 | 0 |
| 4 | 00001964h | BD-R | 2010/9/9 | 2011/3/3 | 100 | 2 |
| 5 | 00001970h | BD-RE | 2010/8/8 | - | 1 | 0 |
| 6 | 00001981h | BD-R | 2009/7/7 | 2009/10/10 | 150 | 3 |
| 7 | 00001986h | BD-R | 2011/2/2 | 2011/5/5 | 2 | 0 |
| 8 | 00001987h | BD-RE | 2008/6/6 | 2008/8/8 | 200 | 4 |
| 9 | 00001987h | BD-RE | 2008/6/6 | - | 1 | 1 |
| ... | ... | ... | ... | ... | ... | ... |

RECORDING/REPRODUCING SYSTEM AND SERVER

INCORPORATION BY REFERENCE

The present application claims priority from Japanese application JP2012-022649 filed on Feb. 6, 2012, the content of which is hereby incorporated by reference into this application.

BACKGROUND OF THE INVENTION

The present invention is one that pertains to a recording and reproducing system and a server.

As background art of in the present technical field, there is JP-A-2005-25861. In JP-A-2005-25861, regarding recording media whose read-out quality has a tendency to deteriorate, there is mentioned, as an optical disc device for avoiding data loss and a data protection method, the fact of "furnishing an optical disc device and a data protection method capable of protecting recorded data before data loss occurs, by judging the extent of read-out quality deterioration".

SUMMARY OF THE INVENTION

However, in JP-A-2005-25861, there is only taken into account a data protection method for data whose read-out quality has diminished.

Accordingly, the object of the present invention is to furnish a recording and reproducing system and server for which it is possible to appropriately protect data of a recording medium having plural recording faces (e.g. having recording faces on both sides).

In order to solve the aforementioned problem, there is e.g. adopted a configuration in accordance with the claims.

According to the present invention, it is possible to furnish a recording and reproducing system and server for which it is possible to appropriately protect data of a recording medium having plural recording faces.

Problems, configurations, and effects other than those mentioned above are made clear from the below-mentioned embodiments.

BRIEF DESCRIPTION OF THE DRAWINGS

FIG. 13 is an example of optical disc management information.

DETAILED DESCRIPTION OF THE INVENTION

Hereinafter, the embodiments will be described using the drawings.

Embodiment 1

Figure 1:
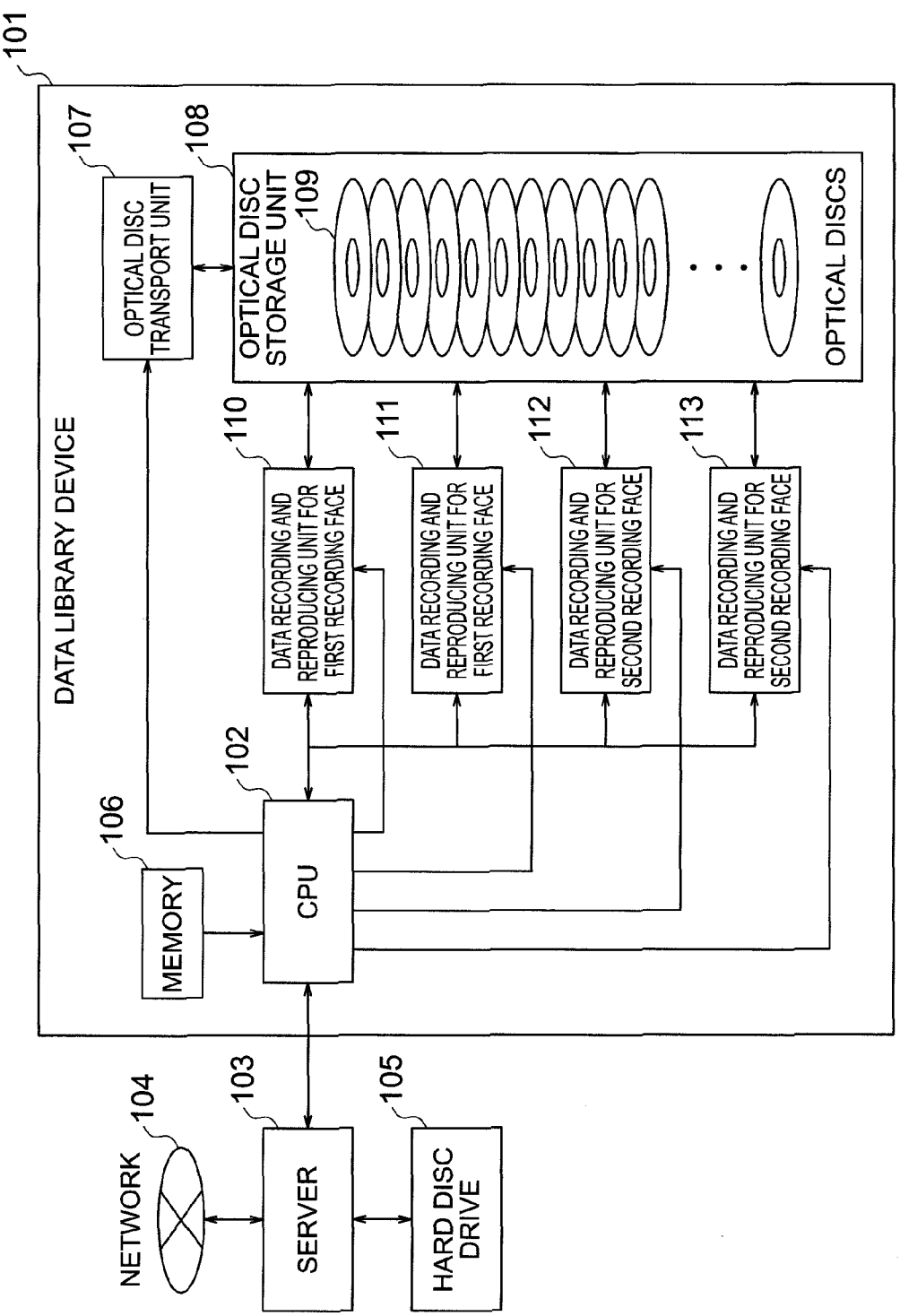
FIG. 1 is a block diagram showing the configuration of a data library device.

FIG. 1 is a block diagram showing a configuration of a data library device.

Ref. 101 designates a data library device which, during recording, receives data from a network 104 and, via a server 103, stores the same in a hard disc drive 105, and records the stored data on an optical disc 109. During reproduction, data are reproduced from hard disc drive 105 or an optical disc 109 and are sent, via server 103, to network 104. Ref. 103 designates a server which, together with controlling the data library device by means of communication with a CPU (Central Processing Unit) 102 built into data library device 101, controls hard disc drive 105, and carries out data management such as data recording and reproduction and data transmission and reception via network 104. Ref. 105 designates a hard disc drive that is controlled by server 103 and stores data sent from network 104. In FIG. 1, hard disc drive 105 is illustrated on the outside of server 103, but a configuration in which it is included inside server 103 is also acceptable. Ref. 109 designates optical discs having recording faces on both sides, the same recording faces being expressed as a first recording face and a second recording face. As for optical discs 109, a plurality thereof is stored in the interior of optical disc storage unit 108. In FIG. 1, only one optical disc storage unit 108 is illustrated, but a plurality thereof may be incorporated and it does not matter if different ones are used for different purposes, e.g. one as an unrecorded disc storage unit and the other as a recorded disc storage unit. Of course, it does not matter if the interior of optical disc storage unit 108 is delimited into an unrecorded disc storage domain and a recorded disc storage domain. At the time of data recording, an optical disc 109 is extracted from optical disc storage unit 108 by means of an optical disc transport unit 107 and is loaded into either a data recording and reproducing unit 110, 111 for a first recording face or a data recording and reproducing unit 112, 113 for a second recording face and when data recording comes to an end, the disc is returned to optical disc storage unit 108 by means of optical disc transport unit 107. Besides, at the time of data reproduction, an optical disc 109 is extracted from optical disc storage unit 108 by means of optical disc transport unit 107 and is loaded into either a data recording and reproducing units 110, 111 for a first recording face or a data recording and reproducing unit 112, 113 for a second recording face, data are reproduced and, when data recording comes to an end, the disc is returned to optical disc storage unit 108 by means of optical disc transport unit 107. Refs. 110 and 111 designate data recording and reproducing units for a first recording face and Refs. 112 and 113 designate data recording and reproducing units for a second recording face, the same being controlled by CPU 102 of the data library device and carrying out data recording onto optical discs 109 or data reproduction from optical discs 109. Also, during reproduction, data recording and reproducing units 110 and 111 for a first recording face and data recording and reproducing units 112 and 113 for a second recording face have the possibility to acquire the read-out quality on the occasion of reading out data recorded in optical discs 109, so it is possible to transmit the same to server 103 via CPU 102. "Read-out quality" refers to information indicating the quality of recorded data, such as how much error correction processing has been carried out on the occasion of the read-out. Further, In the description below, in the case where there is not particularly any need to make a distinction between the data recording and reproducing units for a first recording face and the data recording and reproducing units for a second recording face, the same will simply be described as the data recording and reproducing units. Ref. 107 designates an optical disc transport unit which is controlled by CPU 102 of data library device 101, extracts an optical disc 109 from optical disc storage unit 108, transports the same, and loads the same into a data recording and reproducing unit 110, 111, 112, 113. Alternatively, it receives an optical disc 109 from a data recording and reproducing unit 110, 111, 112, 113, transports the same, and stores the same in optical disc storage unit 108. In addition, an optical disc may also be transported between recording and reproducing units, e.g. from recording and reproducing unit 110 to recording and reproducing unit 111. Also, in the case where data library device 101 has several optical disc storage units built in, optical disc transport unit 107 may transport an optical disc from a built-in optical disc storage unit to another built-in optical disc storage unit. Ref. 102 refers to the CPU of data library device 101, which controls optical disc transport unit 107 in accordance with a request from server 103, selects the desired optical disc from among the plurality of optical discs 109 stored in optical disc storage unit 108, and sends the same to a data recording and reproducing unit 110, 111, 112, 113. Also, it controls optical disc transport unit 107 to receive an optical disc 109 from a data recording and reproducing unit 110, 111, 112, 113 and stores the optical disc in a designated location inside optical disc storage unit 108. Ref. 106 designates a memory in which programs and various pieces of settings information for controlling CPU 102 of the data library device are stored.

Figure 2:
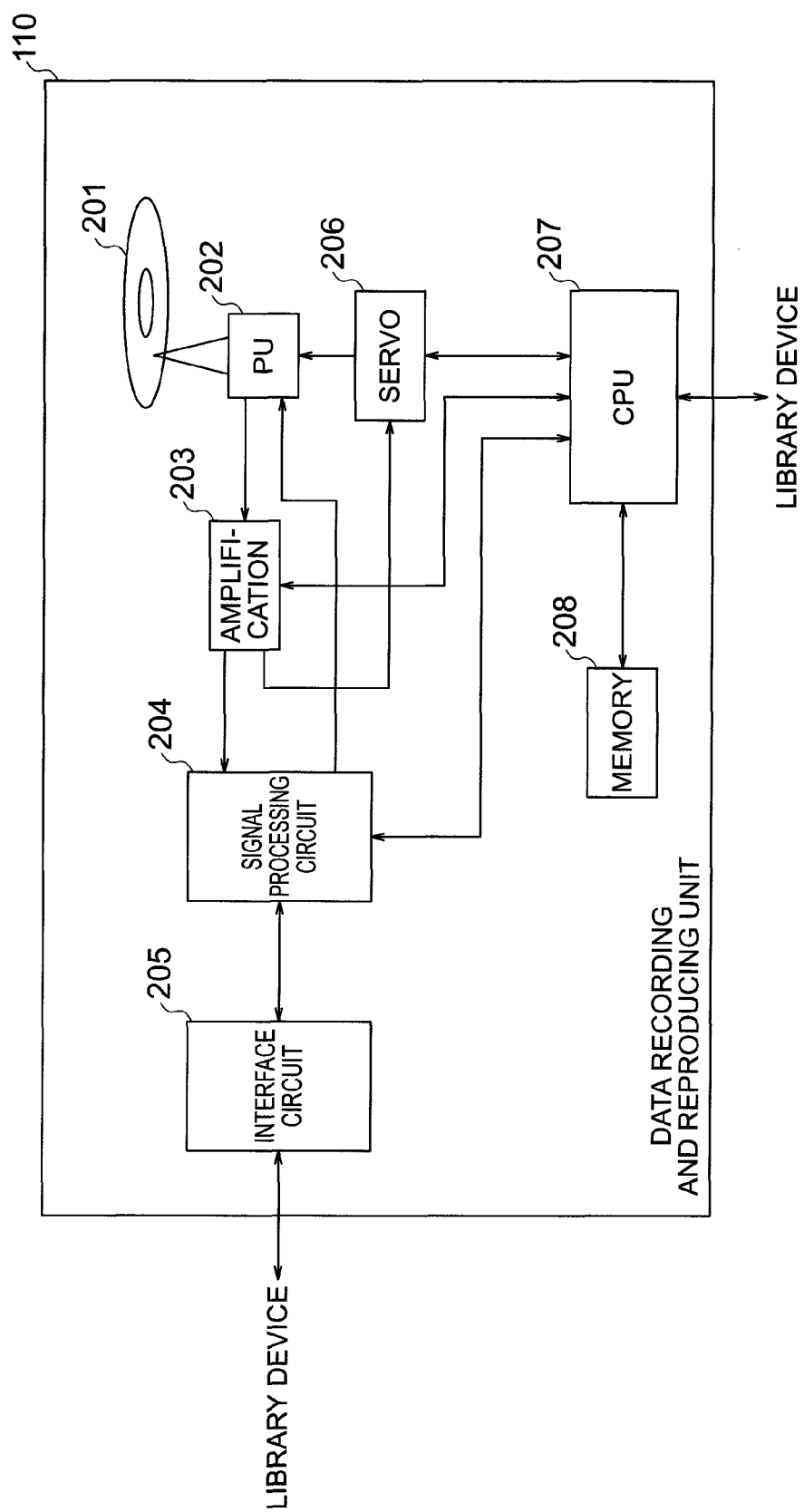
FIG. 2 is a block diagram showing the configuration of a data recording and reproducing unit.

FIG. 2 is a block diagram showing the configuration of a data recording and reproducing unit. Ref. 110 designates a data recording and reproducing unit for a first recording face, which records data input from CPU 102 of the data library device onto an optical disc. Also, the data reproduced from the optical disc are output to CPU 102 of the data library device.

Ref. 207 designates a CPU which carries out control of the recording processing and reproduction processing of data recording and reproducing unit 110. Further, it does not have to be a CPU but there may also be used any circuit capable of the same control. Ref. 201 designates a data recording medium having recording faces on both sides, e.g. a DVD-RAM (Digital Versatile Disc—Random Access Memory). Further, in the description below, it will be described simply as an optical disc 201. Also, the data recording medium is not necessarily limited to being an optical disc but may also be a recording medium such as an opto-magnetic disc or a hologram. Ref. 202 designates an optical pickup which reads out a signal from optical disc 201 and sends the same to an amplification circuit 203. In addition, a modulated signal sent from a signal processing circuit 204 is recorded onto optical disc 201. Ref. 203 designates an amplification circuit which amplifies the reproduced signal read out from optical disc 201 via optical pickup 202 and sends the same to signal processing circuit 204. Also, it generates a servo signal and sends the same to a servo circuit 206. Ref. 204 designates a signal processing circuit which modulates an input signal and sends data on which error correction and the like have been carried out to an interface circuit 205. In addition, it carries out operations such as adding an error correction code to the data sent from interface circuit 205, modulates the same, and sends the same to optical pickup 202. Ref. 205 designates an interface circuit which carries out data transfer processing that is compliant with e.g. SATA (Serial Advanced Technology Attachment) or another transfer method. During data transfer, the data sent from signal processing circuit 204 are sent to the CPU of the library device being a host. Also, the data sent from the CPU of the library device being a host are sent to signal processing circuit 204. Ref. 208 designates a memory which stores programs and various pieces of settings information for controlling the data recording and reproducing unit, medium information acquired from the optical discs, and the like. Further, there has been shown an example in which memory 208 is connected with CPU 207 inside a data recording and reproducing unit, but the connection may be made anywhere inside or outside the data recording and reproducing unit. Also, as long as data can be saved, it does not have to be a memory but may also be e.g. a hard disc drive. Ref 206 designates a servo circuit which controls optical pickup 202 by means of a servo signal generated in amplification circuit 203.

By means of the data recording and reproducing units of the aforementioned configuration, it is possible to record the data bound for an optical disc in accordance with an instruction from CPU 102 of data library device 101 and, in addition, to generate data from the optical disc and transfer the same to CPU 102 of data library device 101. Further, a description has been given here regarding data recording and reproducing unit 110 for a first recording face, but data recording and reproducing unit 111 for a first recording face or data recording and reproducing units 112 and 113 for a second recording face have the same configuration.

Figure 3:
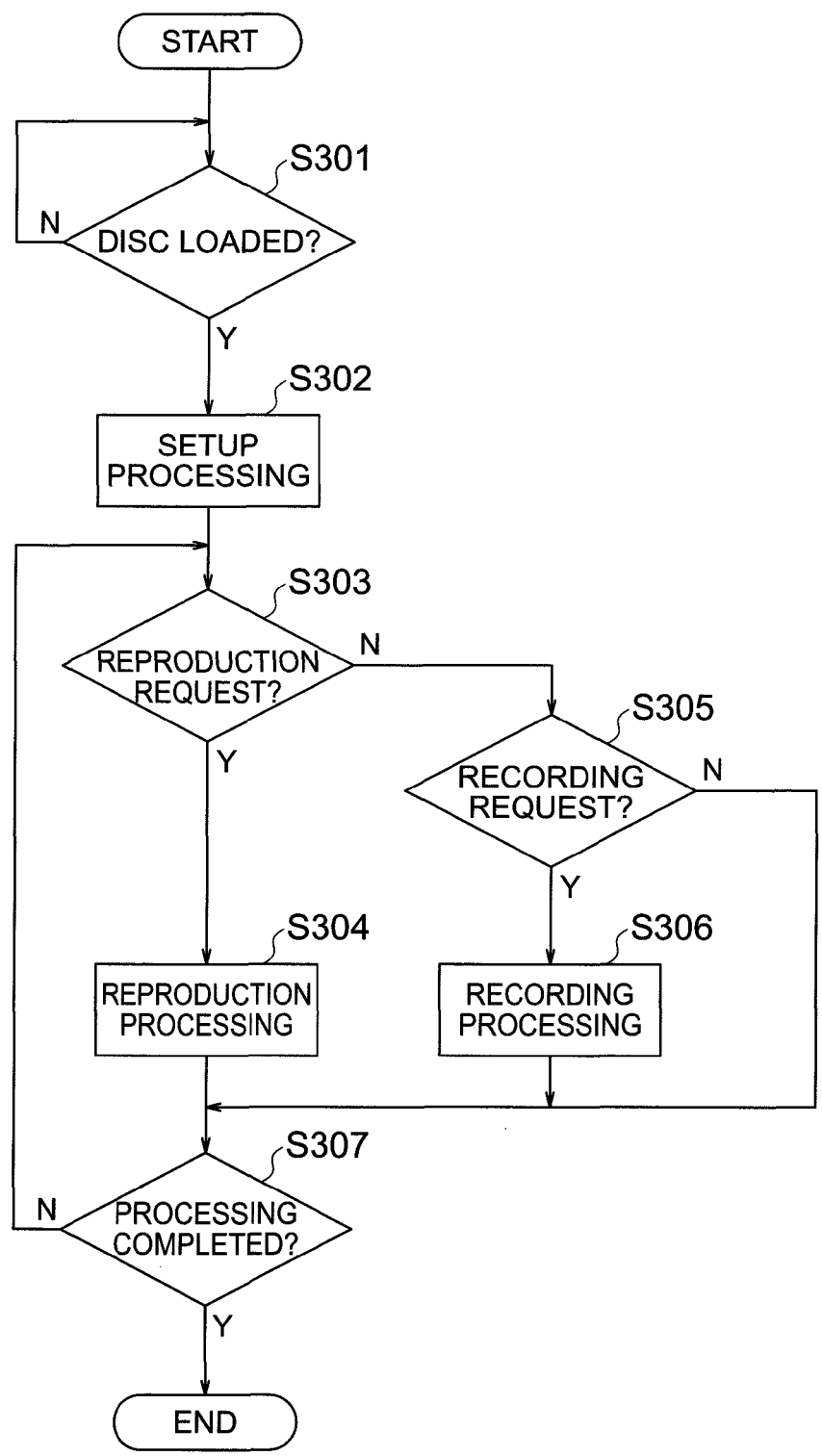
FIG. 3 is a flowchart showing the operation of a data recording and reproducing unit.

FIG. 3 is a flowchart showing the operation of a data recording and reproducing unit.

If, in Step S301, an optical disc is mounted in a data recording and reproducing unit, setup processing is carried out in Step S302.

Next, if there has been requested, in Step S303, data generation from the CPU of a data library device, data reproduction processing is carried out in Step S304. Alternatively, if there has been requested, in Step S305, data recording from the CPU of the data library device, recording processing is carried out in Step S306. In the case where, in Step S307, reproduction or recording processing has come to an end, processing is terminated.

Figure 4:
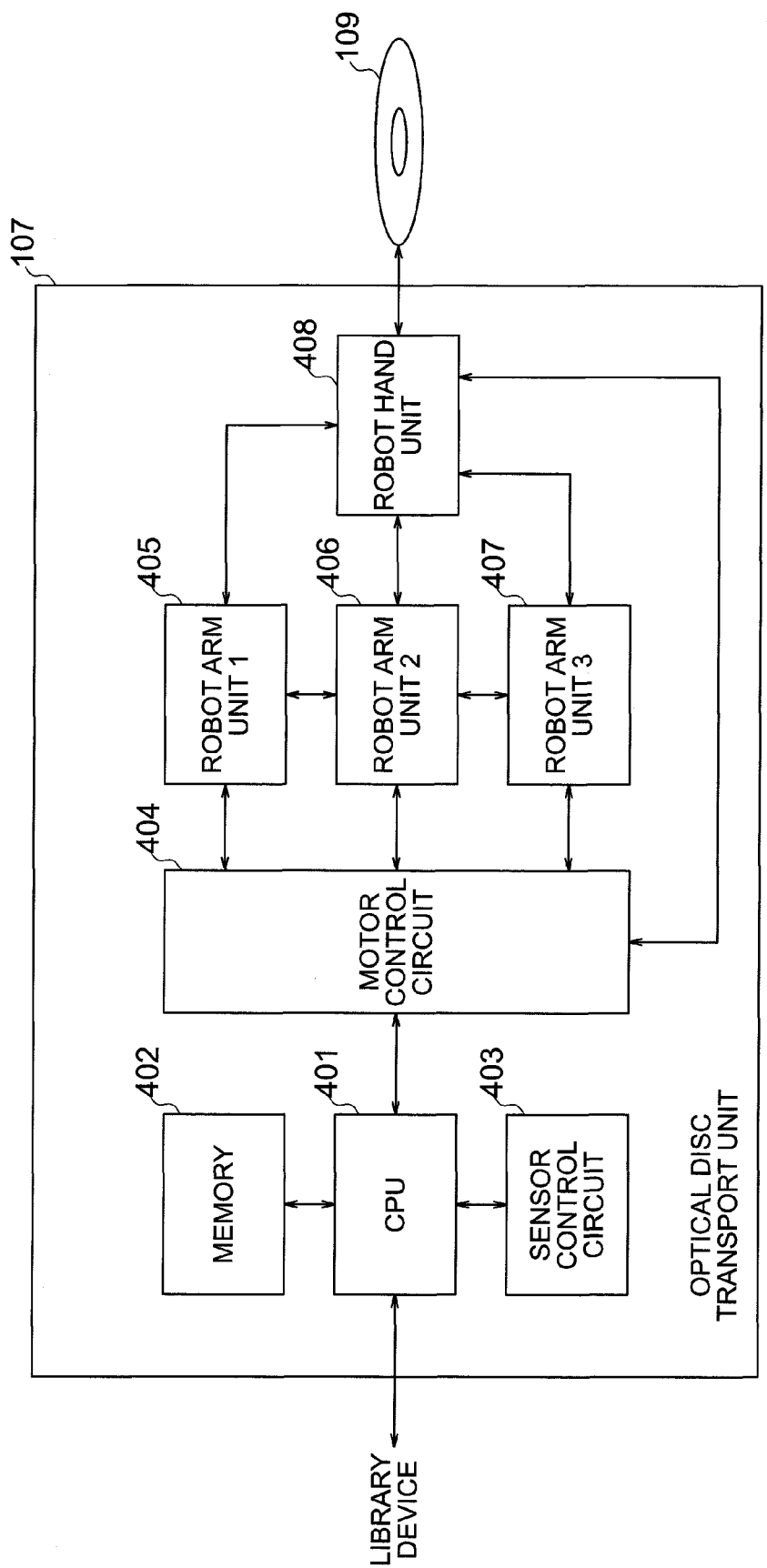
FIG. 4 is a block diagram of an optical disc transport unit.
Figure 5:
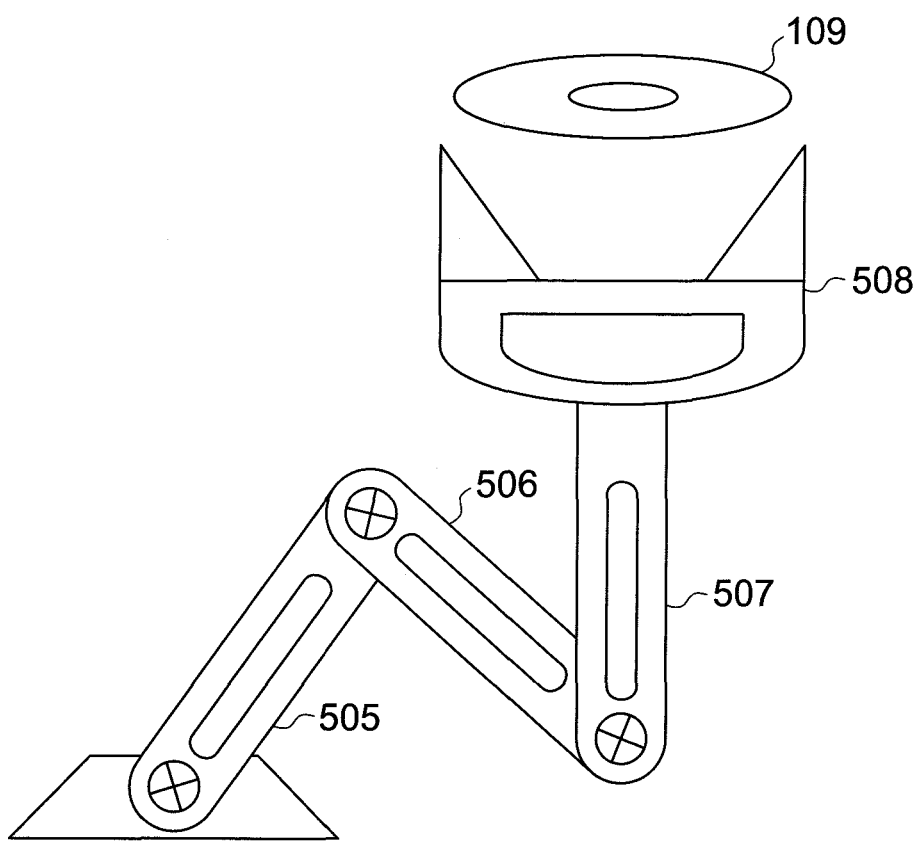
FIG. 5 is an external view of an optical disc transport unit.

FIG. 4 is a block diagram of an optical disc transport unit and FIG. 5 is an external view of an optical disc transport unit.

Ref. 107 designates an optical disc transport unit which receives an instruction from CPU 102 of data library device 101, extracts an optical disc 109 from optical disc storage unit 108 and loads the same into a data recording and reproducing unit 110, 111, 112, 113. Also, it extracts the optical disc from the data recording and reproducing unit and stores it in the optical disc storage unit.

Ref. 401 designates a CPU (Central Processing Unit) which carries out control of the optical disc transport unit. Ref. 402 designates a memory which stores programs and various pieces of settings information for controlling the optical disc transport unit. Further, there has been shown an example in which memory 402 is connected with CPU 401 inside the optical disc transport unit, but the connection may be made anywhere inside or outside the optical disc transport unit.

In addition, as long as data can be saved, the means does not have to be a memory but may also be e.g. a hard disc drive.

Ref 403 designates a sensor control circuit which, on the basis of an instruction from CPU 401, controls various sensors. Also, it receives input signals from the various sensors and notifies CPU 401 thereof.

Ref 404 designates a motor control circuit which, on the basis of an instruction from CPU 401, drives robot arm units 405, 406, and 407. Also, it drives a robot hand unit 408.

Robot arm units 405, 406, and 407 regulate the position of robot hand unit 408 by rectilinear motion and rotary motion, such as advancing and reversing.

Robot hand unit 408 consists of shapes that are capable of holding an optical disc 109 without breaking the same and carries out extraction/insertion of an optical disc or the transfer thereof, with respect to optical disc storage unit 108 and data recording and reproducing units 110, 111, 112, and 113.

By means of the optical disc transport unit of the aforementioned configuration, it is possible to transport an optical disc between data recording and reproducing units in accordance with an instruction from CPU 102 of data library device 101.

Further, there has here been shown an example in which one optical disc transport unit is present inside the data library device, but it does not matter if plural optical disc transport units are present. Also, the shape of the optical disc transport unit is not limited to the example of FIG. 5 and it does not matter if the system is devised so that the optical disc is fixed and transported utilizing the center hole of the optical disc.

Figure 6:
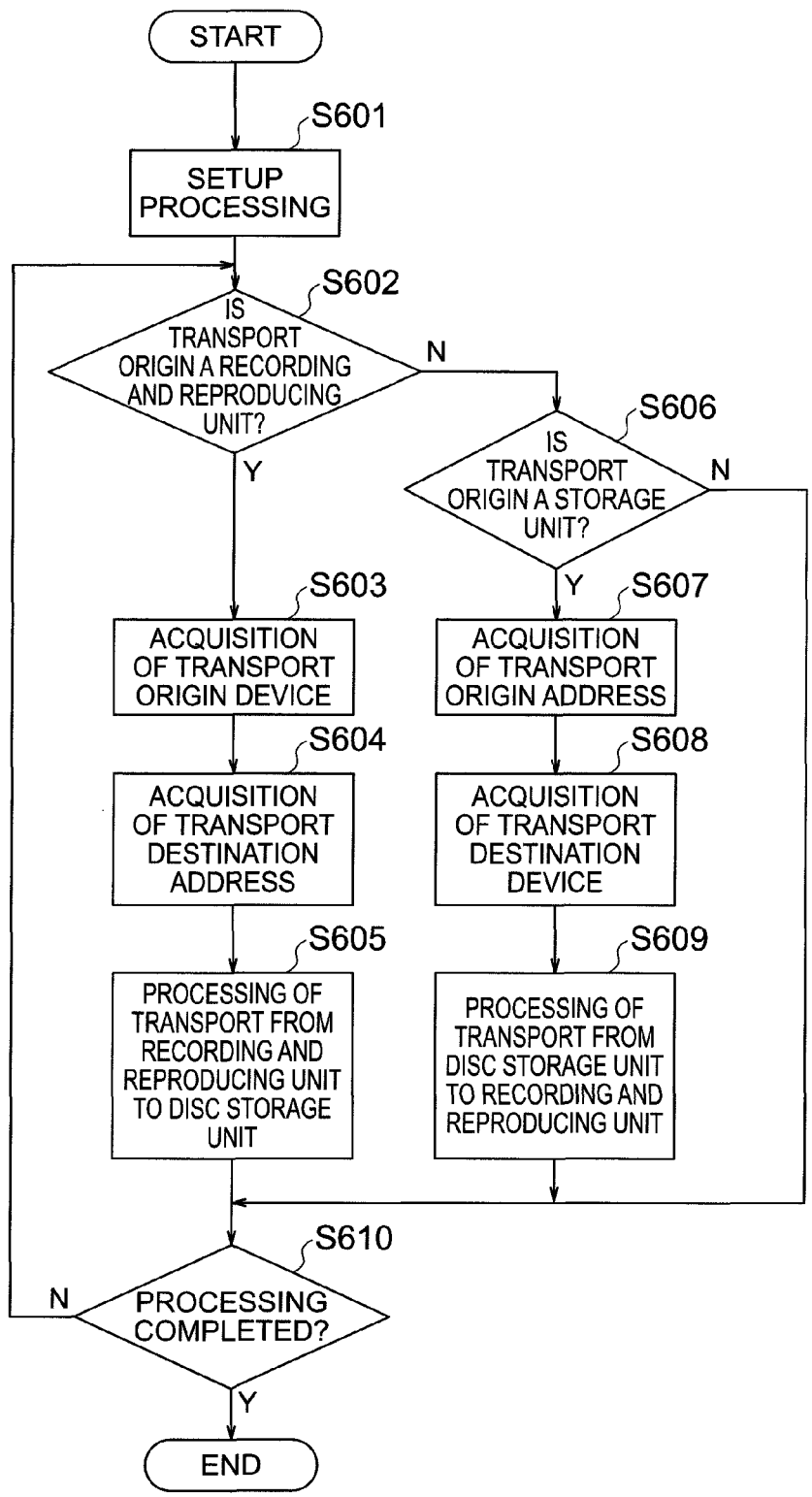
FIG. 6 is a flowchart showing the operation of an optical disc transport unit.

FIG. 6 is a flowchart showing the operation of an optical disc transport unit.

In Step S601, there is carried out setup processing for starting operation of the optical disc transport unit.

Next, in Step S602, if it is the case that it is designated from the host that the transport origin of the optical disc is a data recording and reproducing unit, there is, in Step S603, acquired information about which of data recording and reproducing units 110, 111, 112, and 113 has been designated.

Next, in Step S604, information is acquired about the address inside the optical disc storage unit to which the optical disc will be transported and in which it will be stored and, in Step S605, the optical disc is received from the data recording and reproducing unit being the designated transport origin and the received optical disc is transported to, and stored in, the prescribed address of the data storage unit being the designated transport destination.

Alternatively, in Step S606, if it has been designated from the host that the transport origin of the optical disc is an optical disc storage unit, information is acquired, in Step S607, about the address inside the optical disc storage unit from which the optical disc will be transported and in which it is stored.

Next, in Step S608, there is acquired information about where the optical disc will be transported and transferred, with respect to any of data recording and reproducing units 110, 111, 112, 113, and, in Step S609, the optical disc is acquired from the prescribed address of the optical disc storage unit being the designated transport origin and the acquired optical disc is transported to, and loaded into, the data recording and reproducing unit being the designated transport destination.

In Step S610, in the case where transport processing has been completed, processing comes to an end.

Figure 7:
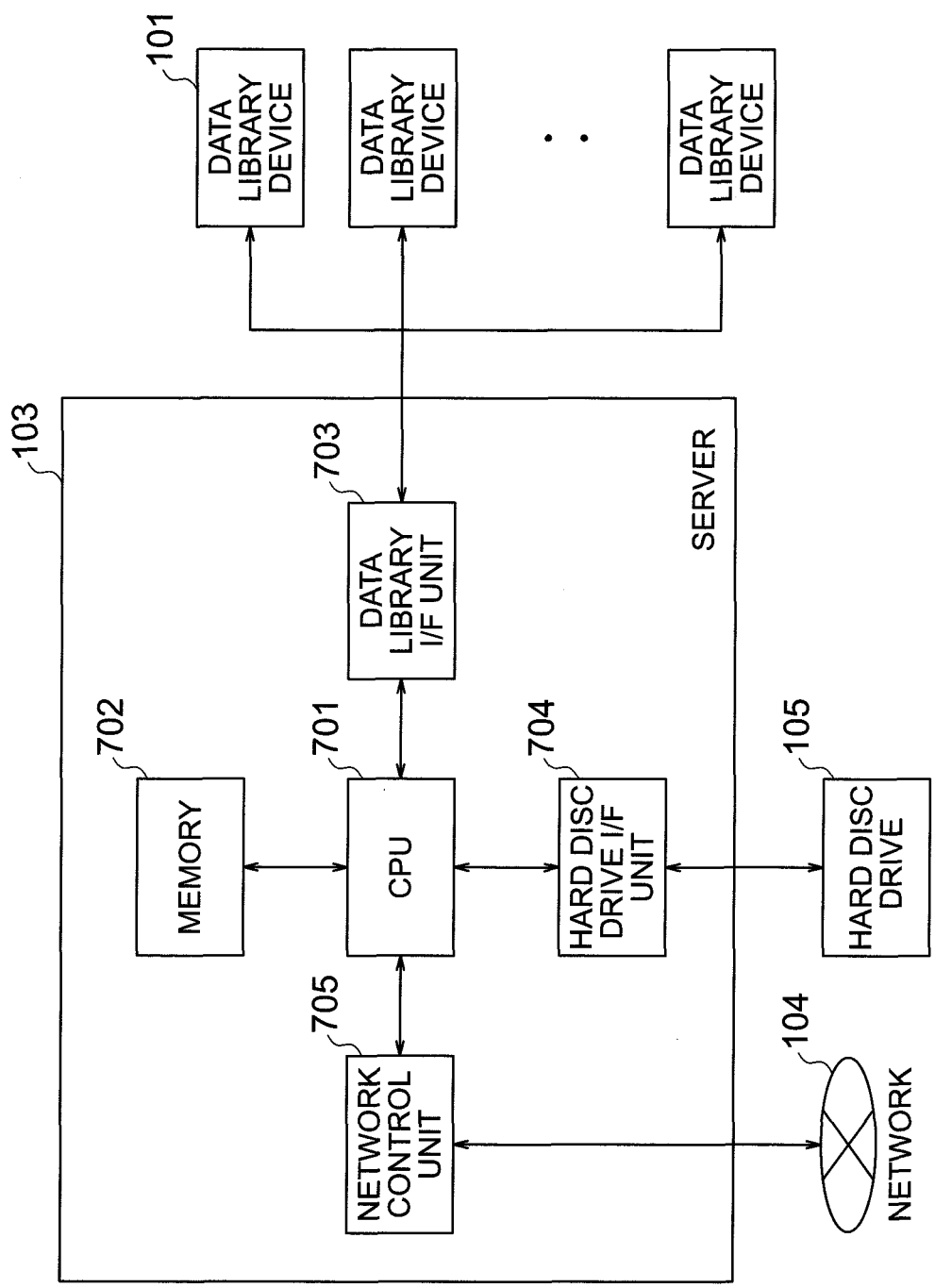
FIG. 7 is a block diagram showing the configuration of a recording and reproducing system.

FIG. 7 is a block diagram showing the configuration of a recording and reproducing system.

The recording and reproducing system is constituted by having one or more data library devices 101, a hard disc drive 105, and a network 104 connected with a server 103.

Ref. 103 designates a server that, together with providing a service centered on data recording and reproduction with respect to data library devices 101, carries out data recording and reproduction in relation to hard disc drive 105 and data transmission and reception as well as administration via network 104.

Ref. 701 designates the CPU of server 103 which, during data recording, records on hard disc drive 105, via a hard disc drive I/F unit 704, the data received via a network control unit 705 from network 104.

Alternatively, it controls a data library device 101 via a data library I/F unit 703 and makes recordings on the optical disc built into data library device 101.

During data reproduction, data are read out from hard disc drive 105 via hard disc drive interface unit 704 and the read out data are transmitted to network 104 via network control unit 705.

Alternatively, a data library device 101 is controlled via a data library device I/F unit 703, data are reproduced from an optical disc built into data library device 101, the reproduced data are received, and the received data are transmitted to network 104 via network control unit 705. Alternatively, together with suitably processing, recording, and administering various pieces of information received from data library device 101 and, in addition, reproducing the same information and determining a control policy on the basis of the reproduced information, actual control is carried out. As administered information, information about optical discs is shown in FIG. 13 as an example. Based on the information shown in FIG. 13, the extent of deterioration of the optical discs may be judged and a control policy may be determined. Also, as for administered information, there can be considered not only information about optical discs but also about data recording and reproducing units, optical disc transport units, and optical disc storage units. As timing for updating these pieces of information, the same may be acquired at the execution timing of each process, such as at the time of recording data, the time of reproducing the same, and the time of transporting a disc, or there may at regular intervals be emitted, from the server, condition check requests to library devices.

Ref 702 designates a memory in which programs and various pieces of information for controlling CPU 701 of server 103 are recorded.

Ref 703 designates a data library I/F unit that carries out control pertaining to data transmission and reception between data library devices 101 and CPU 701 of server 103.

Further, in the diagram, plural data library devices are connected with one data library I/F unit, but e.g. a configuration wherein plural data library devices are connected via a network is also acceptable.

Ref 704 designates a hard disc drive I/F unit that carries out data transfer with hard disc drive 105 in compliance with a standard such as SATA.

Ref 705 designates a network control unit that carries out data transmission and reception between network 104 and CPU 701 of server 103.

Figure 8:
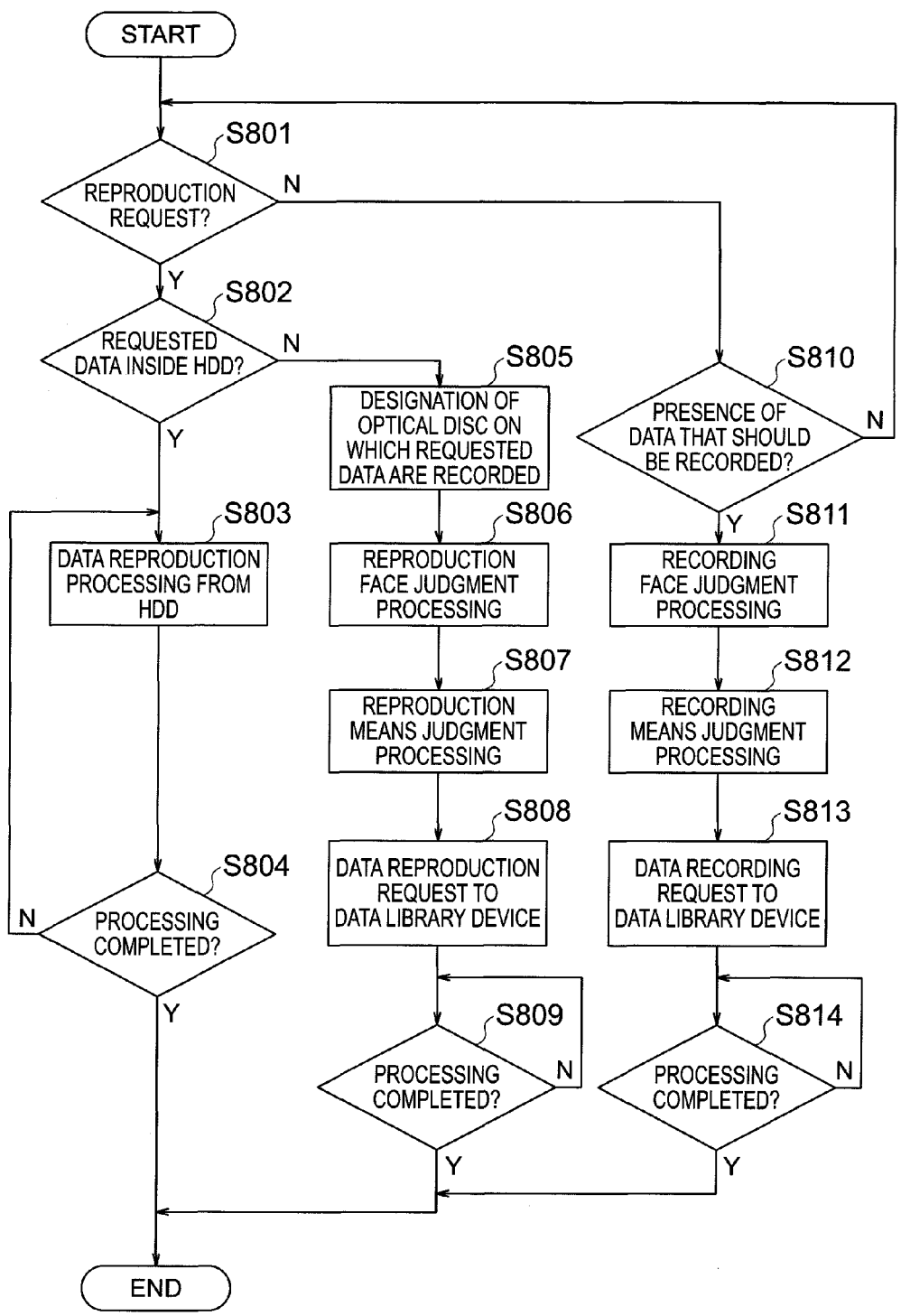
FIG. 8 is a flowchart showing the recording and reproducing operation of a recording and reproducing system.

FIG. 8 is a flowchart showing the operation of a recording and reproducing system.

In the case where a reproduction request has been made to server 103 via network 104 in Step S801, CPU 701 of server 103 investigates, in Step S802, the storage destination of the data for which a reproduction request has been made. If what is concerned is requested data that lie inside hard disc drive 105, CPU 701 of server 103 carries out data reproduction processing from the hard disc drive in Step S803. The reproduced data are transmitted from CPU 701 of server 103 to network 104 via network control unit 705. Also, in Step S804, the reproduction processing is completed.

Alternatively, if it is the case that the requested data do not lie inside hard disc drive 105, CPU 701 of server 103 specifies, in Step S805, the optical disc on which the requested data are recorded.

Next, in Step S806, the recording face of the optical disc to be reproduced is determined and a reproducing means determination process is carried out in Step S807. "Reproducing means determination processing" refers to a process of determining which data recording and reproducing unit, of the data library device, is used. This determination processing is carried out by a program stored in memory 702 of server 103 and the determination of which device is used is carried out by a determination algorithm that is likewise recorded in memory 702. If the data library device to be used in the reproduction and the data recording and reproducing unit to be used has been determined by means of the reproducing means determination processing, the data recording and reproducing unit to be used and the optical disc that should be reproduced are subsequently communicated, in Step S808, with respect to the data library device determined in Step S807, and data reproduction is requested. The reproduced data are sent whenever required from the data library device via data library I/F unit 703 to CPU 701 of server 103 and are transmitted via network control unit 705 to network 104.

Next, if processing in Step S809 has been completed, processing comes to an end.

Also, CPU 701 of server 103 carries out not only control of reproduction processing but also control of recording processing. Here, the start trigger of the recording processing is a request from network 104. In this case, in accordance with the request, it is acceptable to control a suitable data library device and carry out recording control, a detailed description thereof being omitted.

Here, a description will be made in detail regarding the case where the start trigger of the recording processing is one based on the judgment of CPU 701 of server 103, in Step S810.

In Step S810, CPU 701 of server 103 examines whether there are, from among the data recorded in hard disc drive 105, data that should be recorded on the optical disc.

The term "data that should be recorded on the optical disc" refers to data that should be moved from hard disc drive 105 to the optical disc, or data for which there is no hindrance to moving.

The judgment as to which data should be recorded on the optical disc is carried out by a program recorded in memory 702 of server 103 and the judgment as to which data should be recorded on the optical disc is carried out by means of a determination algorithm that is likewise recorded in memory 702. On the occasion of the determination, there may, as an example, be used a criterion such as data for which there has been no reproduction request for at least a fixed time interval.

In the case where there are data that should be recorded, the recording face of the optical disc to be recorded is determined in Step S811 and recording means determination processing is carried out in Step S812. The term "recording means determination processing" refers to processing in which, for recording data on an optical disc, it is determined which data recording and reproducing unit of which data library device and which optical disc are used. This determination processing is carried out by a program recorded in memory 702 of server 103 and the determination of which device is utilized is carried out by means of a determination algorithm that is likewise stored in memory 702.

If, by means of recording means judgment processing, the data library device to be used for recording, the data recording and reproducing unit to be used, and the optical disc to be used have been determined, the data recording and reproducing unit to be used and the optical disc that should be used are subsequently transmitted in Step S813 to the data library device determined in Step S812 and, in addition, the data that should be recorded are transferred and data recording is requested.

Next, it is determined in Step S814 whether processing has been performed.

By means of the aforementioned configuration, in the recording and reproducing system of the present embodiment, it is possible to receive a reproduction request from the network and reproduce the data from the hard disc drive.

Figure 9:
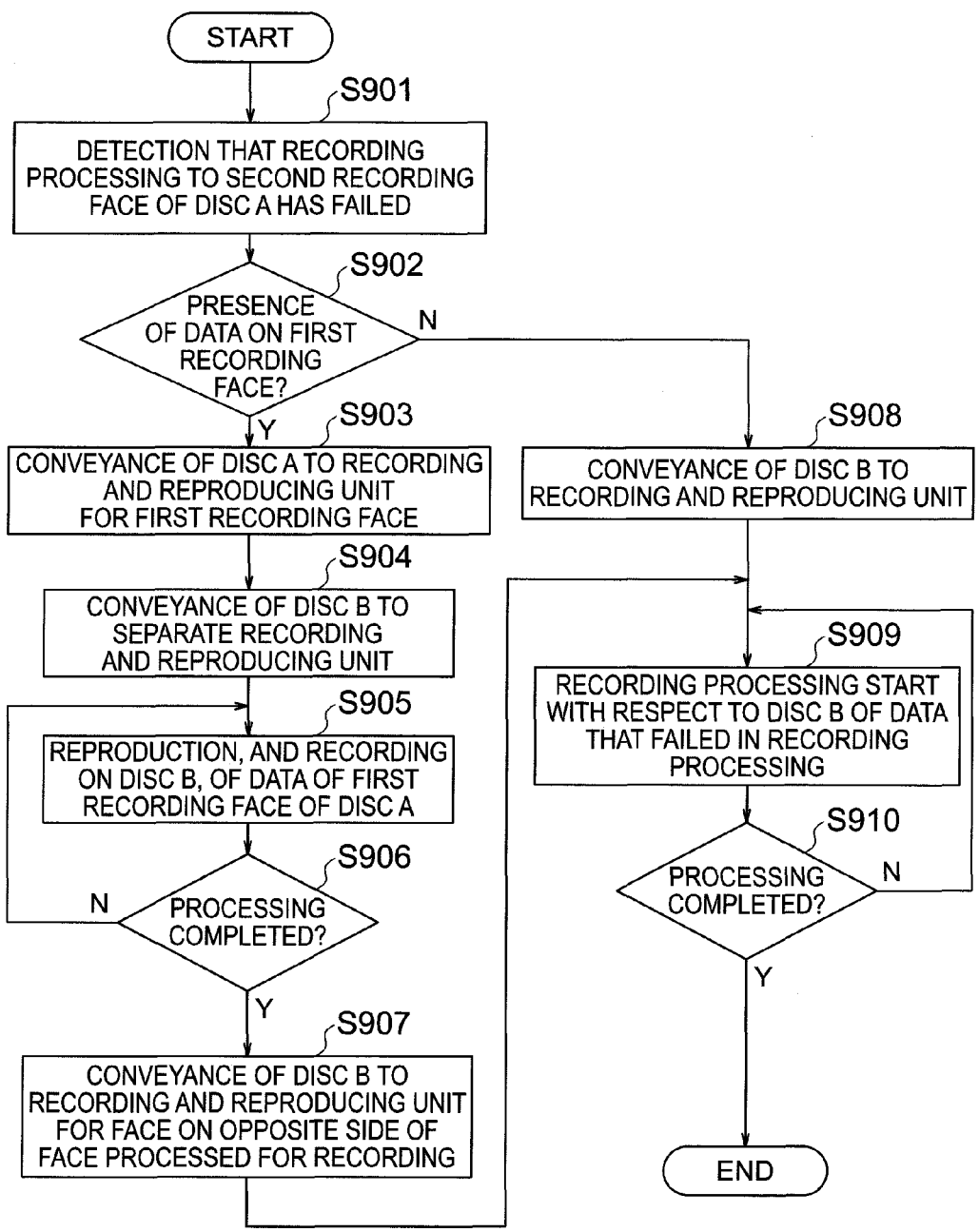
FIG. 9 is a flowchart showing optical disc duplication operation in the case where a fault has been generated in the recording processing.

Here, in the case where a fault is generated during the recording processing described in FIG. 8, there is a need to destroy this optical disc and rerecord, for a second time, on a separate, new optical disc. The only thing is that in the case where data have already been recorded on the recording face that is opposite to that recording face, of the optical disc to be destroyed, on which recording processing was being performed, there is a need to duplicate these already recorded data on a separate optical disc. FIG. 9 is a flowchart showing the optical disc duplication processing in the case where a fault has been generated during the recording processing of the recording and reproducing system. In order to make a description while distinguishing the two faces of the optical disc, these recording faces are expressed as the "first recording face" and the "second recording face". Also, the optical disc for which recording processing has failed is expressed as "Disc A" and the optical disc being the destination of the duplication of the data recorded on Disc A is expressed as "Disc B". A description will be given regarding an optical disc data duplication method occurring in the case where a fault has been generated during recording processing with respect to the second recording face of Disc A.

In the case where CPU 701 of server 103 has detected in Step S901 that recording processing has failed with respect to the second recording face of Disc A, CPU 701 of server 103, in Step S902, reads out information about Disc A from memory 702 and determines whether data have been recorded on the first recording face. In the case where data have been recorded on the first recording face, Disc A is extracted in Step S903 from the recording and reproducing unit for a second recording face and conveyed to a data recording and reproducing unit capable of reproducing the first recording face. Further, in Step S904, Disc B capable of recording on both sides and that was stored in optical disc storage unit 108 is conveyed to a data recording and reproducing unit that is different from the data recording and reproducing unit conveyed to in Step S903. Further, the optical disc conveyance method is as shown in FIG. 6. And then, the data recorded on the first recording face of Disc A are reproduced in Step S905 and the read out data are recorded on Disc B. Further, the recording and reproduction method is as described in FIG. 8. In Step S906, it is judged whether the processing of duplication to Disc B, with respect to all the data recorded on the first recording face of Disc A, has been completed and in case it has been completed, in Step S907, Disc B is conveyed to a data recording and reproducing unit that is capable of recording and reproduction on the face that is opposite to the face on which the data of the first recording face were recorded. And then, in Step S909, recording processing of the data planned for recording on the second recording face of Disc A is implemented with respect to Disc B. If the processing is completed in Step S910, the duplication processing becomes complete.

Also, since in the case where data are not recorded on the first recording face of Disc A in Step S902, duplication processing of the first recording face becomes unnecessary, so Disc A, for which recording processing failed in Step S908, is extracted from the data recording and reproducing unit and recording-capable Disc B, stored in optical disc storage unit 108, is conveyed to a data recording and reproducing unit. And then, in Step S909, recording processing of the data that were planned to be recorded on the second recording face of Disc A is implemented with respect to Disc B. In Step S910, if the processing is completed, the result is processing completion.

Further, in CPU 701 of server 103, if the generation of a fault in the recording processing is detected, it is acceptable to update the administration information of memory 702 about the optical disc with the result thereof and make the optical disc that cannot be used specifically enabled.

Also, in the present embodiment, a description has been given of the operation regarding the case in which a fault has been generated during recording processing onto the second recording face of a recording medium, but the same effect is obtained even regarding the case where a fault has been generated during processing of recording onto the first recording face.

Due to the foregoing, in the case where the processing of data recording onto an optical disc has failed, recording processing by switching to a separate optical disc becomes possible. Further, in the case where there was a face already having data recorded on an optical disc for which recording processing has failed, it becomes possible to make a recording on a separate optical disc, together with the data of the same face. Further, by extracting the optical disc for which recording processing has failed from a data library device, it is possible to discharge unnecessary optical discs and to use optical disc storage unit 108 efficiently.

Further, until recording onto both faces of an optical disc reaches completion, it is also considered not to delete the original data used in the recording processing, from hard disc drive 105 on the server 103 side. By proceeding in this way, it becomes possible, in the case where data have been recorded on the first recording face and an error has been generated during recording of data onto the second recording face, not to read out data from the first recording face but to read out the data recorded on the first recording face from hard disc drive 105 and make a recording on a separate disc.

Embodiment 2

Figure 10:
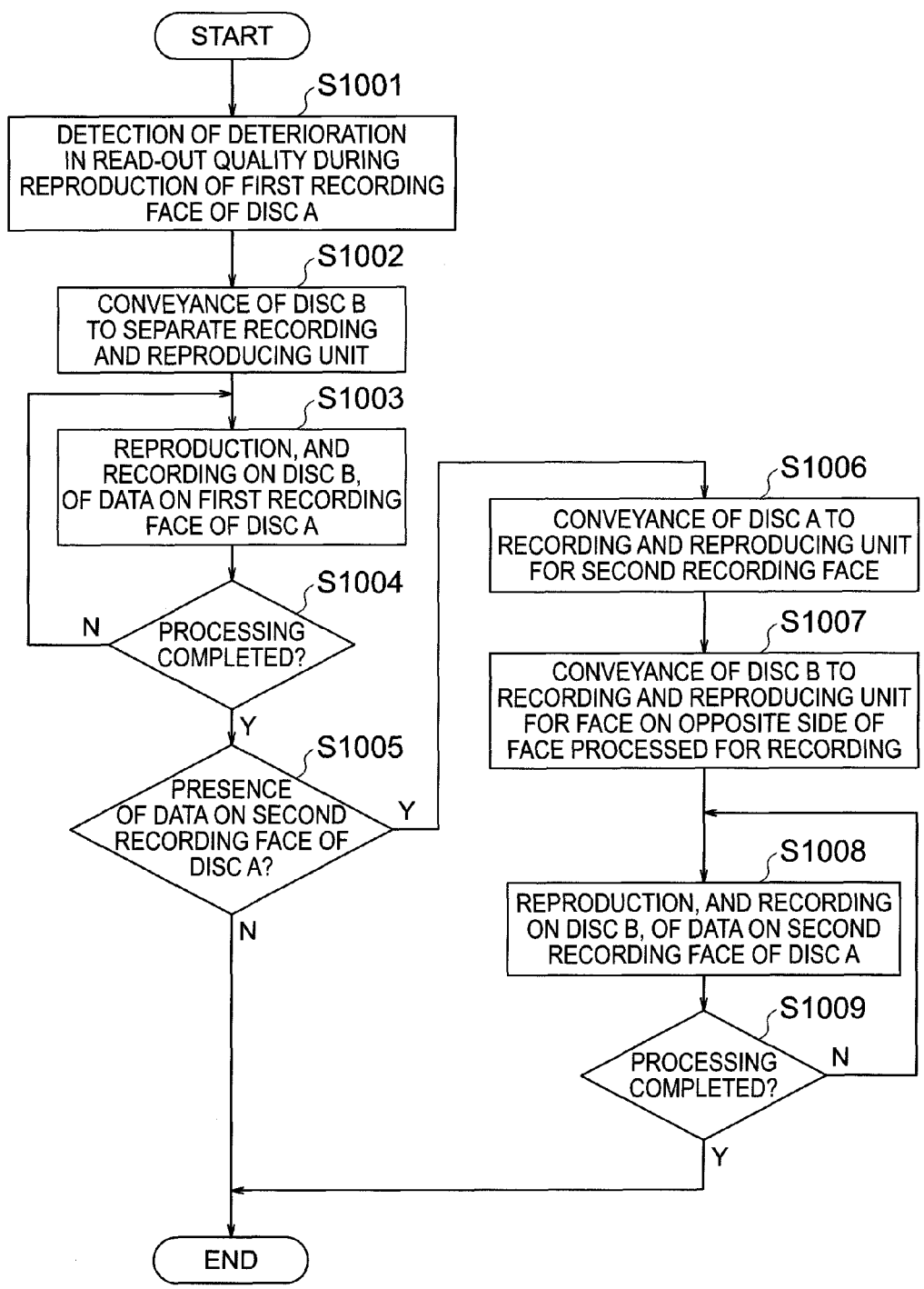
FIG. 10 is a flowchart showing optical disc duplication operation in the case where deterioration in the read-out quality has been detected in the recording processing.

Next, a description will be given regarding data duplication processing in the case where deterioration in the read-out quality has been detected during the reproduction processing described in FIG. 8. FIG. 10 is a flowchart showing optical disc duplication processing in the case where deterioration in the data read-out quality has been detected in the reproduction processing of a recording and reproducing system. Similarly to FIG. 9, in order to make the description to distinguish the two faces of an optical disc, these recording faces are expressed as the first recording face and the second recording face. Also, the optical disc for which deterioration in the read-out quality has been detected is expressed as Disc A and the optical disc being the destination of the duplication of the data recorded on Disc A is expressed as Disc B. If, in Step S1001, CPU 701 of server 103 detects deterioration in the read-out quality during reproduction processing of the first recording face of Disc A, the recordable Disc B is, in Step S1002, conveyed from optical disc storage unit 108 to a data recording and reproducing unit that is different from the data recording and reproducing unit implementing the reproduction of the first recording face of Disc A. And then, in Step S1003, the data of the first recording face of Disc A are reproduced and the read out data are recorded onto Disc B. In Step S1004, it is judged, with respect to all data recorded on the first recording face, whether the processing of duplication to Disc B has been completed, and if completion has been reached, CPU 701 of server 103, in Step S1005, reads out information about Disc A from memory 702 and judges whether the data have been recorded on the second recording face of Disc B. If data have not been recorded on the second recording face, the duplication processing reaches completion. In the case where data have been recorded on the second recording face, Disc A is conveyed, in Step S1006, from the data recording and reproducing unit for a first recording face to a data recording and reproducing unit capable of reproducing the second recording face. Further, in Step S1007, Disc B is conveyed to a data recording and reproducing unit capable of recording and reproducing the second recording face. And then, in Step S1008, the data of the second recording face of Disc A are reproduced and the read out data are recorded on Disc B. In Step S1009, when duplication processing is completed, processing reaches completion.

Due to the foregoing, since, in the case where a reduction in the data read-out quality of one face of an optical disc has been detected, there is a possibility that the read-out quality of the same optical disc as a whole is deteriorated, protection of data in units of optical discs becomes possible by making a duplication on a separate optical disc, with respect to the data of both faces of the same optical disc. Also, by discharging, after the data duplication, the optical disc whose read-out quality has deteriorated, it is possible to efficiently use optical disc storage unit 108.

Also, in CPU 701 of server 103, if deterioration in the read-out quality is detected in the reproduction processing, the optical disc administration information of memory 702 may be updated with the same result and optical discs that cannot be used may be specifically enabled.

In addition, in the present embodiment, a description has been given about operation regarding the case in which deterioration in the read-out quality has been detected during reproduction processing for data recorded on the first recording face, but the same effect is obtained in the case where deterioration is detected in the read-out quality during reproduction processing for data recorded on the second recording face of a recording medium.

Embodiment 3

Figure 11:
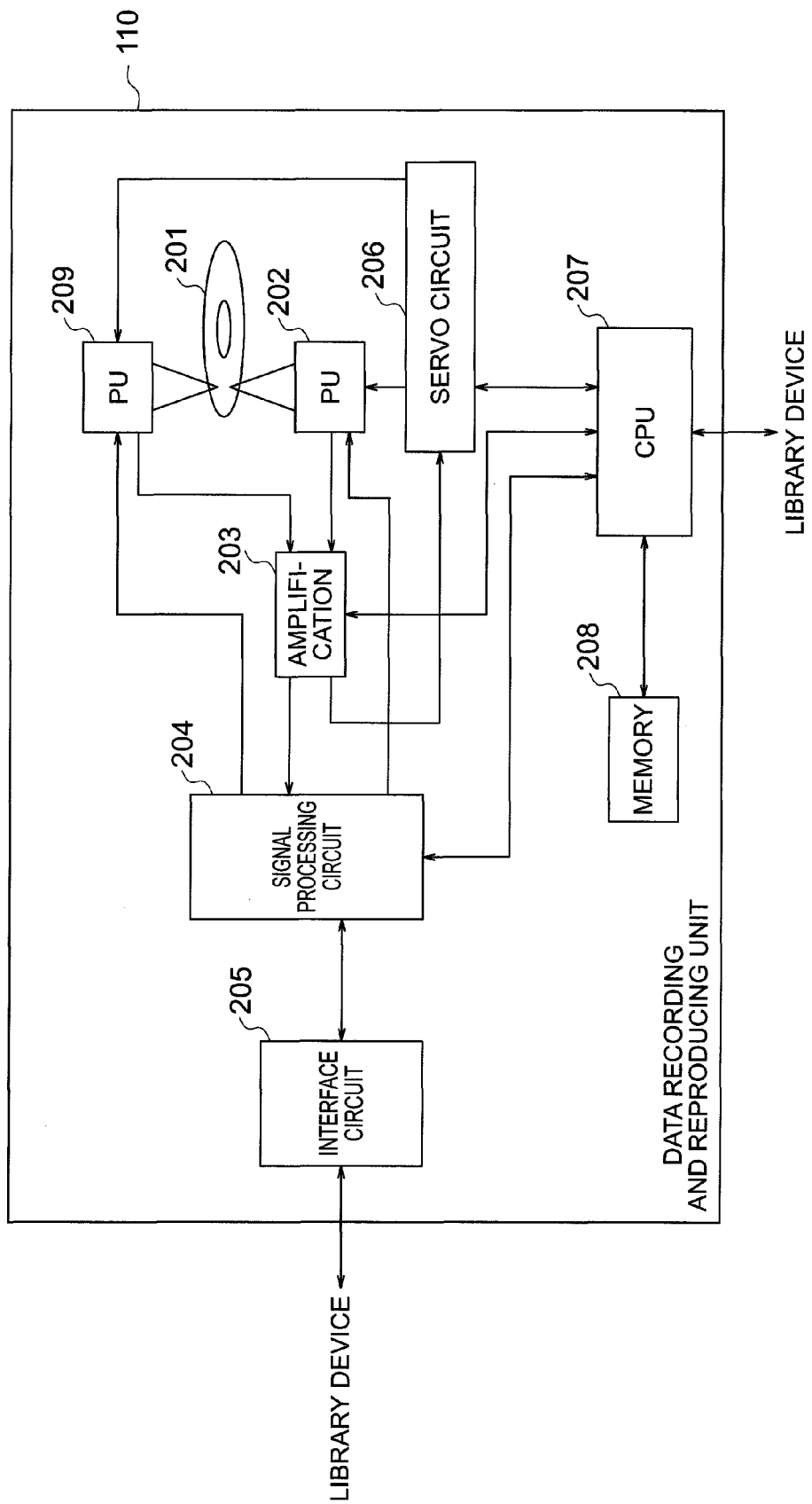
FIG. 11 is a block diagram showing the configuration of a data recording and reproducing unit.

Next, using FIG. 11, a description will be given regarding the case where a data recording and reproducing unit has two optical pickups mounted. Units 201 to 208 in FIG. 11 are the same as in FIG. 2 and Ref. 209 designates an optical pickup. Optical pickup 209 is one that operates with respect to a recording face different from that of optical pickup 202 and in terms of functionality, it is similar to optical pickup 202. CPU 207 selects which of optical pickups 202 and 209 to use by means of an instruction from a higher-level device and, by means of the selected optical pickup, implements the recording and reproduction processing of the optical disc.

Figure 12:
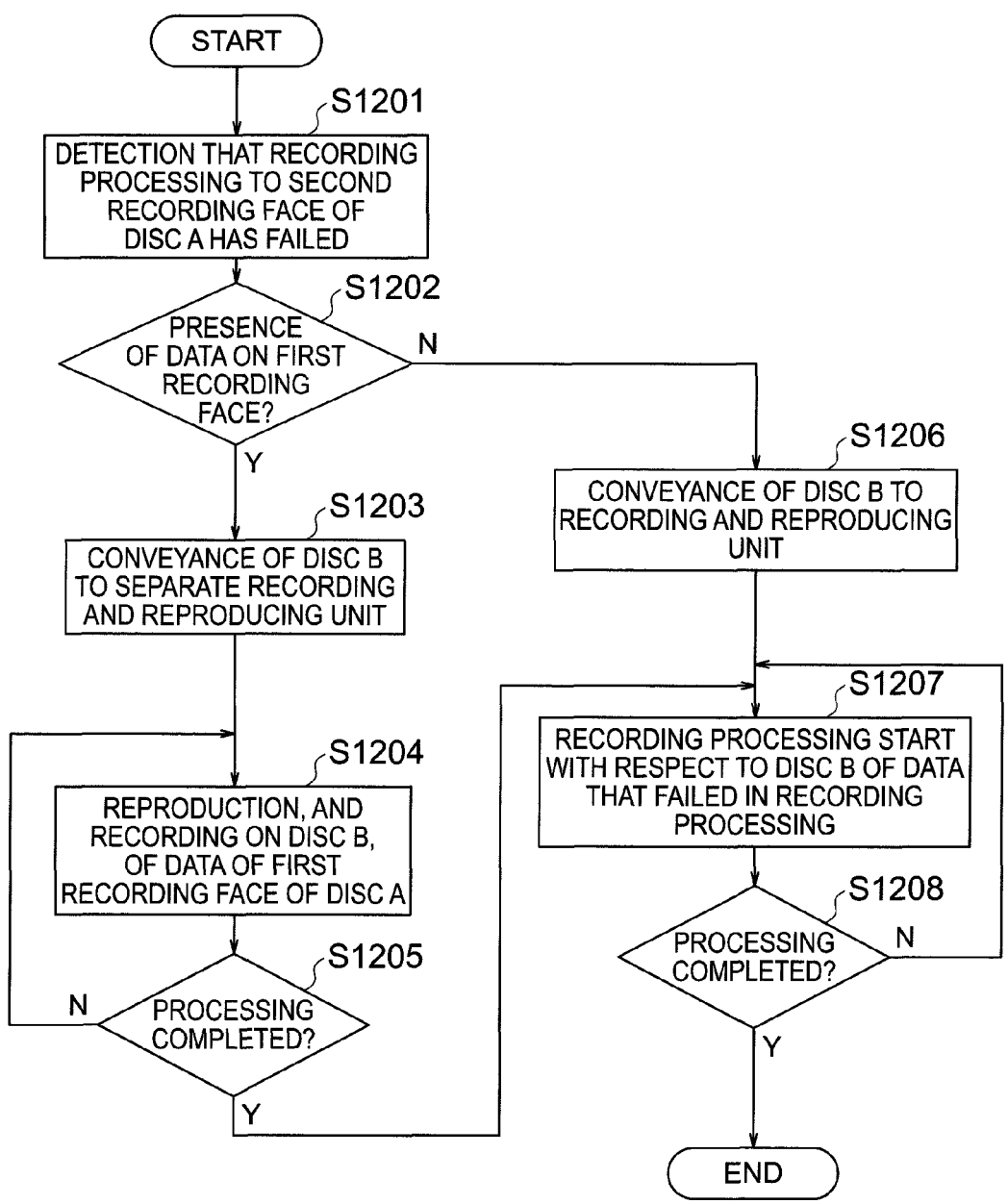
FIG. 12 is a flowchart showing optical disc duplication operation in the case where a fault has been generated in the recording processing.

The operating flow at the time when a fault is generated in recording processing in the case of using this data recording and reproducing unit is shown in FIG. 12. The difference with FIG. 9 is the point that the step of conveying Disc A to a data recording and reproducing unit for a first recording face is unnecessary and the point that, after the recording processing of one face of Disc B has come to an end, the conveyance processing of the disc on the occasion of performing the recording processing with respect to the other face becomes unnecessary. Further, also regarding the case where deterioration in the read-out quality has been detected during reproduction processing, it becomes possible, similarly, to reduce the number of times that an optical disc is conveyed to a data recording and reproducing unit.

In this way, by using a data recording and reproducing unit that is capable of making a recording and/or reproduction with respect to both recording faces, it is possible to cut back the steps of conveying the optical disc to a data recording and reproducing unit in each process, the result being a speed increase in the processing.

Further, in the examples of FIG. 9, FIG. 10, and FIG. 12, in the case of duplicating both faces of an optical disc, there was cited the example of making a duplication on a separate double-sided disc, but it is acceptable to make the recording by distributing the same on two optical discs capable of data recording on one face. In this way, it is possible to reduce the number of discs and it is possible to efficiently use the optical disc storage unit. Further, in the case of duplicating both faces of an optical disc, and in the case of making the duplication on a separate double-sided disc, there is the merit that administration becomes simple.

Also, as handling of an optical disc for which a fault has been generated in the recording processing or an optical disc having a face with deteriorated read-out quality, destruction thereof has been cited as an example in the present invention, but rather than destroying the same, it is also acceptable to convey the same to an area optical disc storage unit 108 that is provided in preparation for destruction and destroy the same at some timing, e.g. at a stage when several discs have accumulated therein.

In addition, the duplicated disc may, after duplication, be conveyed to the location of optical disc storage unit 108 where it was originally stored or it may be stored in a separate location of optical disc storage unit 108, e.g. by providing an area dedicated to recorded discs and conveying the disc thereto.

Also, the information about the optical disc may be held by memory 106 of a data library device 101 rather than by memory 702 of server 103. In this case, the optical disc information acquisition method in Step S902 of FIG. 9 and Step S1005 of FIG. 10 will be that CPU 701 of server 103 makes a read-out from memory 106 via CPU 401 of data library device 101.

In addition, on the occasion of duplicating recorded data on a separate optical disc, it is acceptable, after returning the reproduced data to server 103, to perform control so as to record the same on a separate optical disc or to perform control so as to transmit the data reproduced inside data library device 101 to a data recording and reproducing unit for recording.

Also, on the occasion of duplicating the data, it is acceptable to make a recording on the optical disc that is the destination of duplication after first reproducing all the data, without processing reproduction and recording in parallel. In this case, as for the reproduction data recording and reproducing unit and the recording data recording and reproducing unit, the same data recording and reproducing unit may be used.

In addition, in the aforementioned embodiment, a description has been given taking as an example a recording medium having recording faces on both sides, but the present invention is not limited hereto, it being possible to apply the same to a recording medium having plural recording faces on one side.

Also, in the case where the recording and reproducing system is equipped with plural data library devices, the optical disc duplication processing may be carried out using two data library devices. E.g., in the case where deterioration in the read-out quality in data library device 1 has been detected, data reproduction processing is carried out in data library device 1, the reproduced data are transmitted to data library device 2 via the server, and recording processing is implemented in data library device 2. By proceeding in this way, it is possible to distribute the processing load of each data library device. Alternatively, in the case where the data reproducing unit mounted in data library device 1 is entirely in use, it can be considered to carry out recording processing with a data recording and reproducing unit of data library device 2.

In addition, taking the implementation of the duplication processing as an opportunity, there may be judged whether duplication processing is implemented not only with the timing cited in Embodiment 1 to Embodiment 3, inclusive, but also, on the basis of information such as shown in FIG. 13, with the timing at which the extent of read-out quality deterioration is detected by the server. E.g., there may be a configuration in which, in a first recording face that is different from a second recording face for which recording processing has failed (or in which deterioration in the read-out quality has been detected), the first recording face is used as is without implementing the duplication processing, if the number of reads and/or the number of writes is less than a predetermined fixed value, and duplication processing is implemented if the number is equal to or greater than the predetermined fixed number. Further, in the case where the extent of deterioration on the first recording face is high but the extent of deterioration on the second recording face is low, it is acceptable to implement duplication processing only for the first recording face. By proceeding in this way, efficient use of the optical disc is possible.

Further, the present invention is not one that is limited to the aforementioned embodiments, diverse variations being included therein. E.g., the aforementioned embodiments are ones described in detail in order to describe the present invention comprehensibly and are not necessarily limited to ones comprising the entire described configurations. In addition, it is also possible to add the configuration of one embodiment to the configuration of another embodiment. Also, regarding a portion of the configuration of each of the embodiments, it is possible to make an addition, deletion, or substitution of another configuration.

In addition, as for the respective aforementioned configurations, functions, processing means, and the like, a unit or the whole thereof may be implemented in hardware, such as e.g. by means of making a design with integrated circuits. Also, the respective aforementioned configurations, functions, and the like may be implemented in software by means of a processor interpreting a program implementing the respective functions and executing the same. As for information such as programs, tables, and files, the same can be placed in recording devices such as memories, hard disc drives, and SSDs (Solid State Drives) or recording media such as IC (Integrated Circuit) cards, SD (Secure Digital) cards, and DVDs (Digital Versatile Discs).

Also, there are shown drawings in which control lines and information lines can be considered to be necessary for the description, but products are not necessarily limited to showing all the control lines and information lines. In practice, it may be considered that nearly all configurations are mutually connected.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A recording and reproducing system comprising a server and a data library device,
wherein said server comprises an information recording medium recording data, and a data library interface unit carrying out transmission and reception of data and/or commands with said data library device;
wherein said data library device comprises:
a recording medium storage unit storing one or several recording media which each include a first recording surface and a second recording surface;
several recording and reproducing units that record and reproduce data on said recording media;
a recording medium transport unit transporting and transferring said recording media between said recording medium storage unit and said recording and reproducing units; and
a library control unit carrying out control of said recording medium transport unit and said recording and reproducing units, and transmission and reception of data and/or commands with said server; and
wherein said server has a control unit that, upon receipt of indication of a failure of a recording processing with respect to the second recording surface of a subject said recording media from said library control unit, in a case where data are previously recorded on the first recording surface of the subject said recording media, performs control so as to read out the data from the first recording surface of the subject said recording media in a first recording and reproducing unit, and to record the read out data on one recording surface of a replacement recording media in a second recording and reproducing unit of said several recording and reproducing units; and
said control unit performs control so that, in a case where the recording of the read out data on the one recording surface of the replacement recording media has been completed, data which failed in the recording processing are reproduced from a buffer and recorded onto the other opposite recording surface of the replacement recording media in the second recording and reproducing unit.

2. The recording and reproducing system according to claim 1, wherein said control unit stores a copy of the data of both the second recording surface on which the recording processing has failed and the first recording surface, in said information recording medium, until the recording of data on both sides of said replacement recording media has been completed.

3. The recording and reproducing system according to claim 1, wherein upon receipt of indication of the failure, the recording media transport unit transports the subject said recording media from the first recording and reproducing unit to a third recording and reproducing unit before the control unit performs control so as to read out the data from the first recording surface of the subject said recording media in the first recording and reproducing unit,
said control unit performing control so as to read out the data from the first recording surface of the subject said recording media in the third recording and reproducing unit, and to record the read out data on one recording surface of the replacement recording media in the second recording and reproducing unit.

4. A recording and reproducing system comprising a server and data library devices:
wherein said server comprises an information recording medium recording data and a data library interface unit carrying out transmission and reception of data and/or commands with said data library devices; and
wherein each data library device of said data library devices, comprises:
one or several recording media which each include a first recording surface and a second recording surface, the first recording surface and the second recording surface being on opposing front and back sides of the recording media;
a recording medium storage unit storing one or several of said recording media;
several recording and reproducing units that record and reproduce data on said recording media;
a recording medium transport unit transporting and transferring said recording media between said recording medium storage unit and said recording and reproducing units; and
a library control unit carrying out control of said recording medium transport unit and said recording and reproducing units, and transmission and reception of data and/or commands with said server;
wherein said recording and reproducing units have a means of acquiring information indicating the read-out quality in a reproduction processing of said recording media;
wherein said server has a control unit that, upon receipt of information indicating said read-out quality with respect to the first recording surface of a subject said recording media from said library control unit indicating deterioration in the read-out quality in the reproduction processing, performs control so as to read out the data from the first recording surface of the subject said recording media and to record the read out data on one recording surface of a replacement recording media in a second of said recording and reproducing units; and
said control unit performs control so that data on the second recording surface of said subject recording media are reproduced from the second recording surface of said subject recording media and recorded onto the other opposite recording surface of the replacement recording media in the second recording and reproducing unit.

5. The recording and reproducing system according to claim 4, wherein:
said control unit performs control so that, on the occasion of duplicating a double-sided recorded recording media on said replacement recording media, and in the case where there are two replacement recording media capable of recording on one side only, the data of two sides of said double-sided recorded recording media are, recorded on said two recording media capable of recording on one side only.

6. A server connected with data library devices, wherein:
said data library devices each comprise:
a recording medium storage unit storing one or several recording media which each include at least a first recording surface and a second recording surface;
several recording and reproducing units that record and reproduce data on said recording media; and
a recording medium transport unit transporting and transferring said recording media between said recording medium storage unit and said recording and reproducing units; and
said server has:
a data library interface unit carrying out transmission and reception of data and/or commands with said data library device; and
a control unit that, upon receiving indication of a failure of a recording processing with respect to the second recording surface of a subject said recording media from said data library device, in a case where data are previously recorded on the first recording surface of the subject said recording media, performs control so as to read out the data from the first recording surface of the subject said recording media in a first recording and reproducing unit, and to record the read out data on one recording surface of a replacement recording media in an other recording and reproducing unit of said several recording and reproducing units; and said control unit performs control so that, in a case where the recording of the read out data on the one recording surface of the replacement recording media has been completed, data which failed in the recording processing are reproduced from a buffer and recorded onto the other opposite recording surface of the replacement recording media in the other recording and reproducing unit.

7. The server according to claim 6, wherein a relationship of said first recording surface and said second recording surface is that of a front and back of said recording media.

8. The server according to claim 6, wherein said first recording surface and said second recording surface are located on either side of said recording media.

9. The server according to claim 6, wherein said server comprises an information recording medium recording data; and wherein said control unit does not delete the original data from said information recording medium of said server until the recording of data on said replacement recording media has been completed.

10. The server according to claim 7, wherein:

said control unit performs control so that, on the occasion of duplicating the data of said second recording surface on said replacement recording media and in the case where there are several recording media in said data library device that can only be recorded on one side, the data recorded on said first recording surface and the data recorded on said second recording surface are recorded on different recording media.

11. A recording and reproducing system comprising a server and a data library device, wherein said server comprises an information recording medium recording data, and a data library interface unit carrying out transmission and reception of data and/or commands with said data library device;

wherein said data library device comprises:

a recording medium storage unit storing several recording media which each include a first recording layer and a second recording layer;

several recording and reproducing units that record and reproduce data on said recording media;

a recording medium transport unit transporting and transferring said recording media between said recording medium storage unit and said recording and reproducing units; and a library control unit carrying out control of said recording medium transport unit and said recording and reproducing units, and transmission and reception of data and/or commands with said server; and wherein said server has a control unit that, upon receipt of indication of a failure of a recording processing with respect to the second recording layer of a subject said recording media from said library control unit, in a case where data are previously recorded on the first recording layer of the subject said recording media, performs control so as to read out the data from the first recording layer of the subject said recording media in a first recording and reproducing unit, and to directly record the read out data on one recording layer of a replacement recording media in an other recording and reproducing unit of said several recording and reproducing units; and said control unit performs control so that, in a case where the recording of the read out data on the one recording layer of the replacement recording media has been completed, data which failed in the recording processing are reproduced from a buffer and recorded onto the another recording layer of the replacement recording media or another replacement recording media, in the other recording and reproducing unit.

* * * * *